Patented Dec. 11, 1934

1,984,182

UNITED STATES PATENT OFFICE 1,984,182

PIGMENT

Albert E. Gessler, Yonkers, N. Y., assignor to Zinsser & Company, Incorporated, Hastings-on-Hudson, N. Y., a corporation of New York No Drawing. Application July 30, 1929, Serial No. 382,291

18 Claims. (Cl. 134—58)

The present invention relates to new compositions of matter and methods of making same, the new compositions comprising a finely divided solid with its particles enveloping the particles of an oily or gummy vehicle or non-miscible-with-water substance. The new compositions are useful for diverse purposes depending upon the nature of the ingredients. For example, if the finely divided solid be a pigment, and if the non-miscible-with-water substance be an oily or gummy substance, the resulting compositions will be usable for printing inks or paints. Thus, my invention has its generic aspects as herein stated, and further from a specific point of view relates to new compositions and their production for use as printing inks and paints.

Heretofore inks and paints have been made by mechanically grinding dry pigments with vehicles, usually oils or varnishes. This has generally resulted in a more or less crude dispersion of the pigment in the vehicle. A complete union of the pigment with the vehicle by mechanical grinding can only be effected with great difficulty. In addition, it is only possible to make these mechanical dispersions in certain proportions of the oil and pigment; and if the amount of oil falls below a certain limit, a dispersion becomes technically impossible by such means.

Attempts have also been made to combine pigments and vehicles in the wet state without grinding by mixing pigment suspensions in water with the vehicles or vehicle suspensions in water and treating the mixture of the two with acids or coagulating agents. The resulting material, however, has never had practical value because the product was either oily and sticky or was contaminated with the protective colloids which were employed either to suspend the vehicle or to deflocculate the pigment in water. Moreover, methods have been suggested for the emulsification of the vehicles which either were harmful to the pigments or were not able to produce suitable emulsions.

I have discovered, however, that if pigments are dispersed or suspended in water, preferably before being dried, and the vehicle, as an emulsion or otherwise, is then introduced, and if the mixture is then coagulated by an electrolyte, or any material which on addition of water will have sufficient pH, a very fine and uniform precipitate is obtained which can be handled in ordinary machinery without smearing. This precipitate can thereafter be filtered and dried like any pigment or lake color, but preferably in a vacuum dryer. If the drying is done with agitation, smooth ink or paint will be the direct result. If the drying is done without agitation however the final product will be in the form of lumps. The process can be carried out in any practical proportion of oily medium to pigment; and if the proportion resembles that of ordinary printing inks or paints, the resulting material has a fluffy structure in the lump and in appearance resembles an ordinary dry color. However upon pressing these lumps as, for example, with a knife blade or upon light grinding, the coating of powder is broken and the mass agglomerates or melts easily into a smooth ink or paint showing an extremely fine dispersion.

I have obtained very successful results with a soap of oleic acid and an amine, as an emulsifier; and an organic acid as a precipitant. A suitable amine for this purpose is ethanolamine which is an organic alkali. A suitable organic acid for a precipitant is formic acid.

I give the following example as an illustration of one method of applying the invention.

Into 600 parts of water stir 72.5 parts of litho varnish and 7 parts of oleic acid. To this add 5 parts of triethanolamine dissolved in water. A fine emulsion having the appearance of milk immediately results. Into this emulsion, the smooth color pulp is stirred. As color pulp, I may, for example, employ 250 parts of milori blue press cake (29% dry) pulped with 600 parts of water. This is then precipitated by the addition of 5 parts formic acid diluted with water until the reaction is slightly acid, the whole being thoroughly stirred and finally filtered in an ordinary filter press and washed slightly and then dried into lumps in a vacuum drier without agitation.

Some of the following features are important in my process to produce my novel product, and all of them are preferably employed for the working of the process to produce the best result in all particulars. Thus, in the above example, it is to be noted that:

(1) There must be a sufficient quantity of free fatty acid to make sufficient soap with the alkali to produce a thorough emulsification of the vehicle into such fine oily particles that they will completely unite with the pigment particles.

(2) Preferably the alkali used will be a weak base such as an organic radical substituted amine such as ethanolamine, for the reason that stronger alkali, like ammonia, dissolves many pigments or destroys their color value, and in addition tends to hydrolyze oily vehicle esters.

(3) If the vehicle is a readily oxidizable one, such as boiled linseed oil, it is important that the final product be dried in a vacuum dryer without agitation, or otherwise dried to inhibit oxidation which, if allowed to occur to any large extent, impairs the softness of the product.

The resulting product is then of an apparently dry, fluffy consistency but will easily melt into printing ink or paint on the application of slight pressure or grinding.

Thus, in the above illustrative specific example, an emulsion is made of litho varnish, water, a fatty acid and an ethanolamine. Ethanolamine has the selective ability to attack free fatty acid and form a soap therewith but will not attack oil or varnish by itself. The small amount of soap thus formed by the fatty acid and the ethanolamine, and especially if made in the nascent state as in the example, has high emulsifying ability and is sufficient to emulsify the rest of the varnish without changing it chemically. When this emulsion in mixture with pigments or other solid matter is treated with an electrolyte of a sufficient or suitable hydrogen ion concentration, preferably an organic acid, the above described soap is split up again into the original fatty acid which goes back into the varnish and a water soluble ethanolamine salt. The varnish which in its emulsified state was intimately mixed with the solid particles is now set free as varnish again in fine particles surrounded by the solid particles, which latter so intimately enclose the varnish particles that the resulting product or precipitate is non-smearing and non-adherent to the apparatus, is easily filterable like ordinary pigments, and is not oily in appearance. This is of the greatest importance because an oily, sticky mass cannot be handled as economically by machinery. Moreover, there is the further advantage that the precipitate can be washed free from chemicals and dried in pure form so as to consist of the intimately combined original pigment or other solid and the vehicle.

The novel advantages of my process and resulting product are (1) that it can be handled by machinery on a large scale due to the fact that the product is non-smearing and non-sticky; and (2) that the product is readily filterable and can be washed free from the chemicals used in its manufacture to leave the pure product consisting of the described non-oily and non-sticky intimately combined finely divided vehicle and pigment or equivalent solid substance.

The above example is given as an illustration only and not as a limitation to the particular ingredients or proportions therein specified. It will be quite obvious that other ingredients and proportions may be used and other variations made without departing from the scope of invention herein disclosed.

What I claim is:—

1. Process of producing a material consisting of pigment particles having oily particles completely and uniformly united therewith which possesses the dry appearance of non-oily material, which process comprises emulsifying an oil with sufficient alkali-fatty acid soap to produce a thorough emulsion whose oily particles are so fine as to completely unite with the pigment particles; agitating together said emulsion particles and said pigment particles; and breaking the emulsion to precipitate the aforesaid oily and pigment particles united as aforesaid.

2. Process of producing a material consisting of pigment particles having oily particles completely and uniformly united therewith which possesses the dry appearance of non-oily material, which process comprises emulsifying the oil with sufficient alkali-fatty acid soap to produce a thorough emulsion whose oily particles are so fine as to completely unite with the pigment particles; agitating together said emulsion particles and said pigment particles; and breaking the emulsion to precipitate the aforesaid oily and pigment particles united as aforesaid, the alkali-fatty acid soap being an organic radical substituted ammonia soap.

3. Process of producing a material consisting of pigment particles having oily particles completely and uniformly united therewith which possesses the dry appearance of non-oily material, which process comprises emulsifying the oil with sufficient alkali-fatty acid soap to produce a thorough emulsion whose oily particles are so fine as to completely unite with the pigment particles; agitating together said emulsion particles and said pigment particles; and breaking the emulsion to precipitate the aforesaid oily and pigment particles united as aforesaid, the alkali-fatty acid soap being an ethanolamine soap.

4. Process of producing pigments having an oily vehicle so completely and uniformly incorporated therewith as to possess the dry appearance of a non-oily pigment, which process comprises agitating together a pigment with an oil emulsion having oily particles which are so fine as to completely unite with the pigment particles, said emulsion having been made with an organic radical substituted ammonia soap; and breaking said emulsion to precipitate the aforesaid combined oil and pigment particles.

5. A dry product comprising a pigment having an oil incorporated therewith, the particles of the one being so completely and uniformly united with those of the other that the product possesses the uniform dry appearance of a non-oily pigment.

6. A dry product comprising a pigment having an oil incorporated therewith, the particles of the one being so completely and uniformly united with those of the other that the product possesses the uniform dry appearance of a non-oily pigment but melts into a paste or semi-fluid form on the application of pressure.

7. Process of preparing oil-containing material comprising adding a soap forming fatty acid to an oil, forming an oil-in-water emulsion, intermixing therewith a pigment suspension, and then precipitating the pigment particles upon the oil particles.

8. Process of preparing oil-containing material comprising adding a soap forming fatty acid to an oil, forming an oil-in-water emulsion, intermixing therewith a pigment suspension, precipitating the pigment particles upon the oil particles, agitating the resulting emulsion, and then removing the aqueous component thereof.

9. Process of preparing oil-containing material which comprises intermixing with an oil a soap forming fatty acid, adding the mixture to a quantity of water, emulsifying said vehicle by the addition of a relatively weak alkali, intermixing with said emulsion a pigment suspension, and then precipitating the pigment particles upon the oil particles.

10. Process of preparing oil-containing material which comprises intermixing with an oil a soap forming fatty acid, adding the mixture to a quantity of water, emulsifying said vehicle by the addition of a relatively weak alkali, intermixing with said emulsion a pigment suspension, precipitating the pigent particles upon the oil particles, and then removing the aqueous component of the resulting emulsion.

11. Process of preparing oil-containing material which comprises intermixing with the oil a soap forming fatty acid, adding the mixture to a quantity of water, emulsifying said vehicle by the addition of a relatively weak alkali, intermixing with said emulsion a pigment suspension, precipitating the pigment particles upon the oil particles, and then removing the aqueous component of the resulting emulsion while inhibiting the oxidation of the oil particles.

12. Process of producing pigment compositions consisting of pigment particles having oily particles completely and uniformly united therewith, which comprises emulsifying an oil with a fatty acid soap by forming the said soap in situ, adding to said emulsion pigment particles which have a degree of fineness of the order of precipitated pigments before being dried while agitating the resulting mixture and then precipitating the same in order to completely unite the solid and liquid particles of the emulsion.

13. Process of producing pigment compositions consisting of pigment particles having oily particles completely and uniformly united therewith which comprises emulsifying an oil with a fatty acid soap by forming the said soap in situ, adding to said emulsion pigment particles which have a degree of fineness of the order of precipitated pigments before being dried while agitating the resulting mixture, precipitating the same in order to completely unite the solid and liquid particles of the emulsion and then washing and drying said precipitate.

14. The process of preparing a pigment composition comprising intermixing with an oil a soap forming fatty acid and water, emulsifying said oil by adding an alkali substantially incapable of attacking said oil but capable of forming a soap with said fatty acid, intermixing with said emulsion a pigment in the form of a smooth color pulp and agitating the mixture, precipitating the pigment particles upon the oil particles by adding an electrolyte to said emulsion.

15. The process of preparing a pigment composition comprising intermixing with water an oil varnish and a soap forming fatty acid, forming an emulsion by adding to such mixture an alkali which will not attack the oil varnish and which is incapable of dissolving or harming the color value of a pigment, but which has the property of selectively attacking said fatty acid and of forming a soap therewith, intermixing with said emulsion a pigment suspension and agitating said mixture, precipitating the oil particles upon the pigment particles, and then filtering the resulting product.

16. The process of preparing a pigment composition comprising intermixing with water an oil varnish and a soap forming fatty acid, forming an emulsion by adding to such mixture an alkali which will not attack the oil varnish and which is incapable of dissolving or harming the color value of a pigment, but which has the property of selectively attacking said fatty acid and of forming a soap therewith, intermixing with said emulsion a pigment suspension and agitating said mixture, precipitating the oil particles upon the pigment particles by adding to said mixture an electrolyte, and then filtering the resulting product.

17. The process of preparing a pigment composition comprising intermixing with water an oil varnish and a soap forming fatty acid, forming an emulsion by adding to such mixture an alkali which will not attack the oil varnish and which is incapable of dissolving or harming the color value of a pigment, but which has the property of selectively attacking said fatty acid and of forming a soap therewith, intermixing with said emulsion a pigment suspension and agitating said mixture, precipitating the oil particles upon the pigment particles and splitting up the soap into an oil-soluble fatty acid and a water-soluble alkaline salt, agitating the precipitated mixture and then filtering the same, and finally washing and drying the filtrate.

18. The process of preparing a pigment composition substantially free from contamination with protective colloids, comprising intermixing with water an oil varnish and oleic acid, emulsifying said mixture by adding triethanolamine thereto, and precipitating the pigment particles upon the oil particles by adding formic acid to the emulsion.

ALBERT E. GESSLER.